(No Model.) 2 Sheets—Sheet 2.
G. W. GARDINER.
SPRING FRAME FOR BICYCLES, TRICYCLES, &c.
No. 506,313. Patented Oct. 10, 1893.
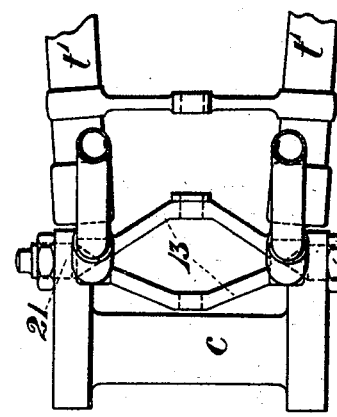
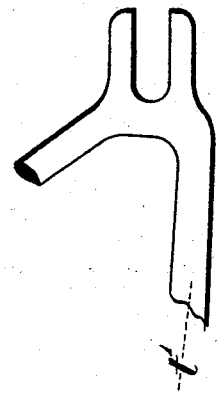
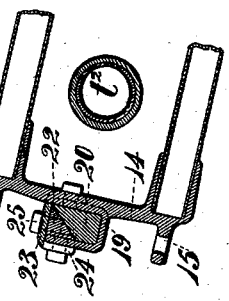
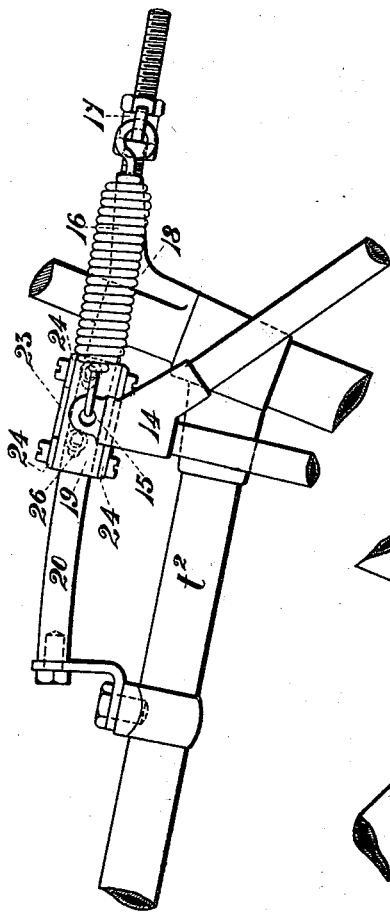
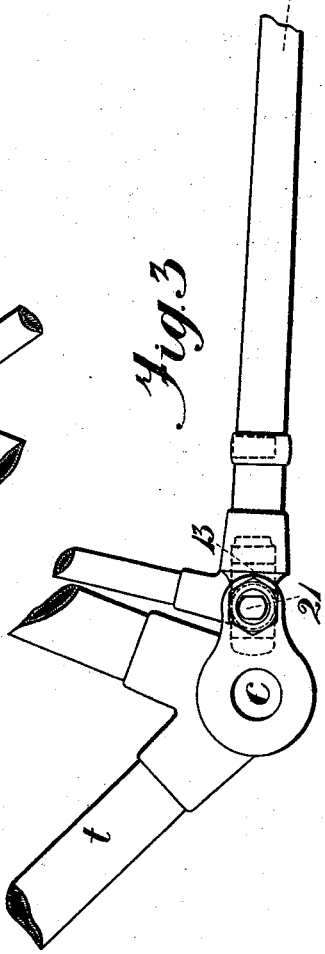
Witnesses
J. A. Harvey.
J. Johnston.
Inventor
G. W. Gardiner
by his attorney
A. Marshall Chapman

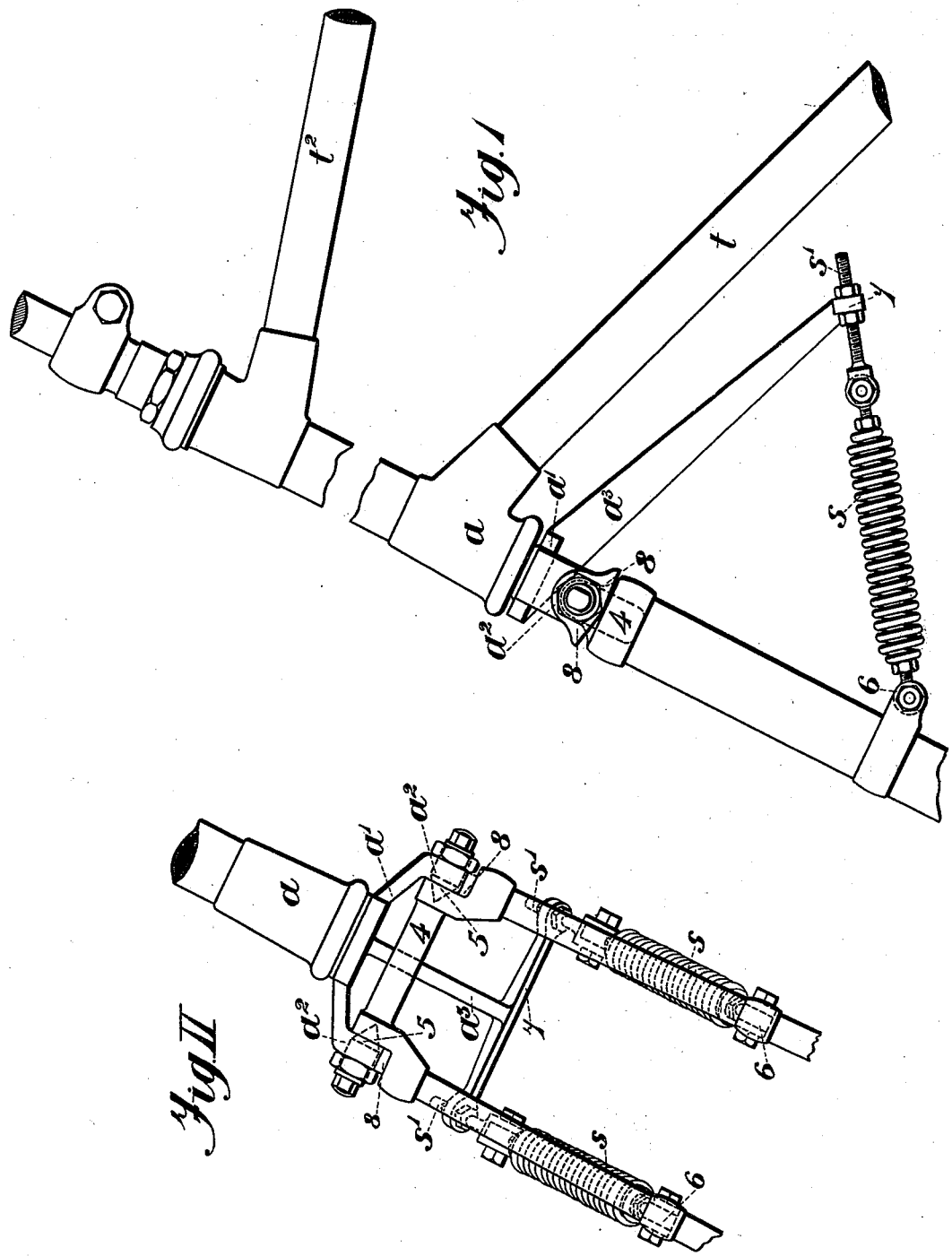

UNITED STATES PATENT OFFICE.

GEORGE WILLIAM GARDINER, OF BISHOP-AUCKLAND, ENGLAND.

SPRING-FRAME FOR BICYCLES, TRICYCLES, &c.

SPECIFICATION forming part of Letters Patent No. 506,313, dated October 10, 1893.

Application filed January 21, 1893. Serial No. 459,278. (No model.)

*To all whom it may concern:*

Be it known that I, GEORGE WILLIAM GARDINER, a subject of the Queen of Great Britain and Ireland, and a resident of Bishop-Auckland, county of Durham, England, have invented certain Improvements in Spring-Frames for Bicycles, Tricycles, and the Like, of which the following is a specification.

This invention relates to improvements in spring frames for bicycles, tricycles and the like.

I will fully describe my invention with reference to the accompanying drawings in which—

Figure 1 shows a side view of part of the front fork and steering socket of a safety bicycle, Fig. 2 showing a front view of the essential parts of the same required in this description. Fig. 3 shows a side view of the framing of a safety bicycle at the crank axle bracket and at the seat pillar ends of the fork tubes from the hind wheel, Fig. 4 showing a plan of apparatus at the said seat pillar ends Fig. 5 is a section on line X Y in Fig. 4. Fig. 6 is a plan of the hinge at the crank axle bracket.

Throughout the following description like marks or letters of reference designate like parts.

Referring to the drawings (Figs. 1 and 2), it will be observed that to the lower end of the center tube of the steering socket A is brazed a crossbar A' with two eyes $A^2$. To the center of this crossbar and at right angles to the axis of the eyes aforesaid an arm $A^3$ is forged which projects behind the steering socket and underneath the tube $t$ which connects the steering socket with the crank axle bracket C (see Fig. 3). Both sides of the front fork are brazed at the top to a bridge 4 which is hinged to the eyes $A^2$ of the crossbar A'. The jointing is clearly shown having cone bearings 5 though other means of jointing might be substituted. On each arm of the fork is secured an eye 6 to each of which eyes is attached one end of certain spiral springs S, the other ends of these springs being connected by adjusting screws S' to the ends of the cross arm 7 formed on the arm $A^3$, or the cross arm 7 may be secured on the arm $A^3$ between nuts so that both the springs S may be adjusted at the same time by one operation by simply adjusting the arm on its bar as shown in Figs. 3 and 4, hereinafter described. The terminal faces of the eyes $A^2$ of the crossbar A' are forged at an angle to form stops 8 to prevent too much movement of the fork either backward or forward. The stops are designed to abut, when in action, against corresponding surfaces on the bridge 4. Thus when the cycle wheel is tilted up by an inequality of the road, the fork assumes a forward angle to the center tube of the steering socket, radiating from the axis of the eyes $A^2$ as a center of motion. This angular motion of the forks is in part controlled by the springs S coming into tension and in no case can the angular motion exceed that provided for by the angle of the stops 8 aforesaid. The springs have the effect of returning the fork to its normal position with regard to the steering socket and thus any vibrations of the machine are in great part absorbed without being felt by the rider.

Referring now to Figs. 3, 4, 5, and 6 it will be seen that the tubes $t'$ of the fork from crank axle bracket C to center of hind wheel of the safety bicycle are brazed to a bridge 13 which is hinged at the crank axle bracket (see Fig. 6) as described in reference to bridge 4 (Figs. 1 and 2). The seat pillar ends of the hind wheel tubes are brazed to a bridge 14 provided with lateral lugs 15 to take the ends of certain springs 16 the other ends of which are hooked or attached to the ends of an adjustable crossbar 17 on an arm 18 projecting behind and attached to the seat pillar socket. In the center of bridge 14 is formed a guide 19 adapted to slide on a guide bar 20 of a right angled triangular section. The guide bar 20 and the arm 18 may be formed in one piece and secured to the seat pillar socket and to the tube $t^2$ as shown in the drawings. Both the guide bar and the guide are curved to a radius equal to the distance from center of joint at crank axle bracket to guide bar. In encountering inequalities on the track or road, the hind wheel in tilting thus causes the guide to slide along the guide bar in opposition to the tension of the springs 16, the triangular frame formed between the guide, center of hind wheel and crank axle bearing thus radiating on the hinged joint 21. The guide 19, for the purpose of taking up slack, through wear by friction on the guide bar, is fitted with a loose block 22 of triangular section, having one side tapered. This block may be held in position in the guide by a cover piece 23 the overlapping lugs 24 of the latter being screwed to the guide.

The taper block may have tapped holes in it in which stud bolts 25 may work. These bolts may pass through slotted holes 26 in the cover 23 so that as the guide wears the loose block can be pushed farther in and then be tightened up by the stud bolts in their new positions in the slots aforesaid. All the working surfaces in connection with the guide must be of a radius corresponding to the aforesaid radius of the guide bar.

I am aware that spring mechanisms of various designs have been already applied to certain parts of cycle frames in a variety of manners; but I believe the invention as above described to be quite distinct from any of the arrangements hitherto adopted.

What I claim as my invention, and desire to secure by Letters Patent, is—

1. The provision in combination with a hinged joint in the forks of front steering safety cycles of safety reverse stops 8 arranged at the extremities of the cross bar A' of the upper part of the front frame-work, of a cross armed lever A³ brazed to this cross bar and of springs S disposed between the extremities of this lever and eyes 6 on the arms of the fork, substantially as and for the purpose set forth.

2. The combination with the hind wheel of safety cycles of a triangular frame, one of the lower apices of which is hinged at the crank axle bracket, the other lower apex carrying the wheel axle, while the upper apex is designed to reciprocate over a short arc of a circle by means of its connection by the guide piece 19 to the guide bar 20, and the connection of the guide piece to the springs 16, these parts being severally arranged and designed to operate substantially as herein set forth.

3. The combination with a hinged triangular frame one lower corner of which carries the hind wheel axle, another lower corner of which is hinged at the crank axle bracket, and the apex of which is fitted with a combined bridge and guide-piece adapted to reciprocate on a guide bar of a right angled triangular section of the taper block 22 of triangular section adapted to be adjusted as to its position within the guide piece by means of the stud bolts 25 working in slots 26 in the cover piece 23 the several parts being arranged and adapted to operate substantially as herein set forth.

In testimony whereof I have signed my name to this specification in the presence of two subscribing witnesses.

GEORGE WILLIAM GARDINER.

Witnesses:
WILLIAM CLEMITSON,
ALFRED STEPHENSON.